(12) United States Patent
Ikeda

(10) Patent No.: US 9,288,455 B2
(45) Date of Patent: Mar. 15, 2016

(54) INFORMATION PROCESSING APPARATUS, CONTROL METHOD OF INFORMATION PROCESSING APPARATUS, AND STORAGE MEDIUM FOR DETERMINING WHETHER A PROJECTION PATTERN OF A CURRENT FRAME DIFFERS FROM THAT OF A PREVIOUS FRAME

(71) Applicant: CANON KABUSHIKI KAISHA, Tokyo (JP)

(72) Inventor: Makoto Ikeda, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 494 days.

(21) Appl. No.: 13/682,140

(22) Filed: Nov. 20, 2012

(65) Prior Publication Data
US 2013/0141569 A1   Jun. 6, 2013

(30) Foreign Application Priority Data
Dec. 6, 2011   (JP) ................................ 2011-267258

(51) Int. Cl.
*H04N 5/232*   (2006.01)
*H04N 9/31*   (2006.01)
*G01B 11/25*   (2006.01)

(52) U.S. Cl.
CPC ............. *H04N 9/3191* (2013.01); *G01B 11/25* (2013.01)

(58) Field of Classification Search
CPC ...................................................... H04N 5/232
USPC ................... 348/136–141, 239; 345/426, 730
See application file for complete search history.

(56) References Cited

U.S. PATENT DOCUMENTS

| 5,719,953 | A | * | 2/1998 | Okabayashi et al. | .......... 382/151 |
| 6,049,385 | A | | 4/2000 | Norita et al. | |
| 6,172,755 | B1 | | 1/2001 | Norita et al. | |
| 6,545,670 | B1 | * | 4/2003 | Pryor | .................... G06F 3/0425 345/156 |
| 6,546,139 | B1 | | 4/2003 | Kondo et al. | |
| 6,912,069 | B1 | | 6/2005 | Matsunoshita | |
| 6,931,156 | B2 | | 8/2005 | Kondo et al. | |
| 8,818,027 | B2 | * | 8/2014 | Forutanpour | ........... G06F 3/017 345/156 |

(Continued)

FOREIGN PATENT DOCUMENTS

| JP | H09-325009 A | 12/1997 |
| JP | 2000-184181 A | 6/2000 |
| JP | 2001-127983 A | 5/2001 |
| JP | 2001-304815 A | 10/2001 |

(Continued)

OTHER PUBLICATIONS

English translation of Japanese Official Action dated Sep. 4, 2015, issued in counterpart Japanese Patent Application No. 2011-267258.

(Continued)

*Primary Examiner* — Paulos M Natnael
(74) *Attorney, Agent, or Firm* — Fitzpatrick, Cella, Harper & Scinto

(57) ABSTRACT

An information processing apparatus includes a data generation unit to sequentially generate projection patterns. A projection unit projects a projection pattern onto a target object every frame. A trigger signal generation unit generates a trigger signal when it is detected that the projection pattern of the current frame, to be projected onto the target object, is different from the projection pattern of a previous frame. An imaging unit images the target object, onto which the projection pattern is projected, according to the trigger signal.

15 Claims, 15 Drawing Sheets

(56) References Cited

U.S. PATENT DOCUMENTS

| | | | |
|---|---|---|---|
| 2004/0036717 A1* | 2/2004 | Kjeldsen et al. | 345/730 |
| 2007/0098386 A1* | 5/2007 | Yoneda et al. | 396/60 |
| 2007/0176927 A1* | 8/2007 | Kato et al. | 345/426 |
| 2007/0216644 A1* | 9/2007 | Nam | G06F 3/0386 345/158 |
| 2011/0143811 A1* | 6/2011 | Rodriguez | 455/556.1 |
| 2011/0243380 A1* | 10/2011 | Forutanpour | G06F 3/017 382/103 |
| 2012/0188411 A1* | 7/2012 | Jang | 348/239 |

FOREIGN PATENT DOCUMENTS

| | | |
|---|---|---|
| JP | 2002-287254 A | 10/2002 |
| JP | 2002-366931 A | 12/2002 |
| JP | 2006-266957 A | 10/2006 |
| JP | 4391137 B | 12/2009 |

OTHER PUBLICATIONS

Japanese Office Action dated Sep. 4, 2015, issued in corresponding Japanese Patent Application No. 2011-267258.

* cited by examiner

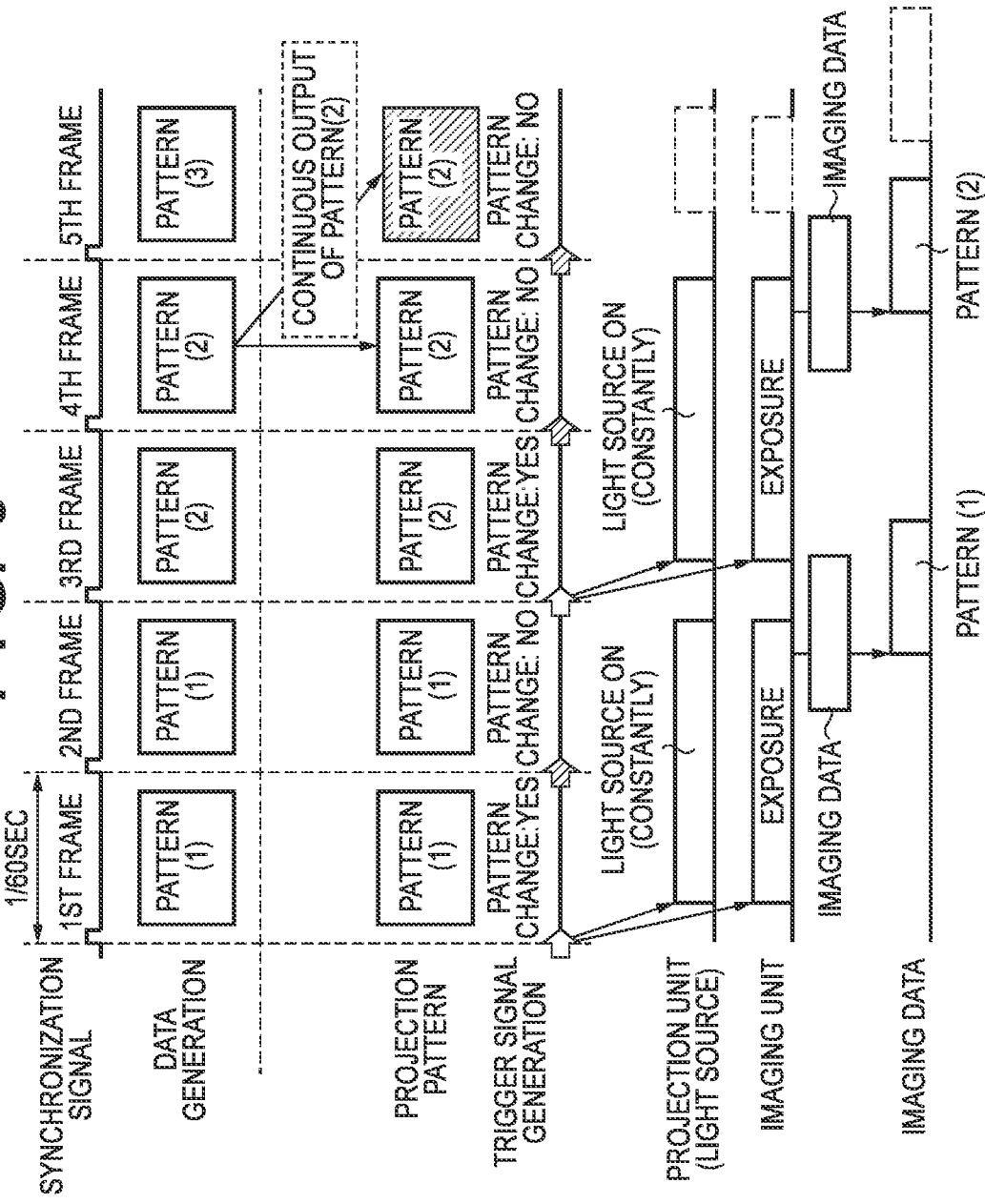

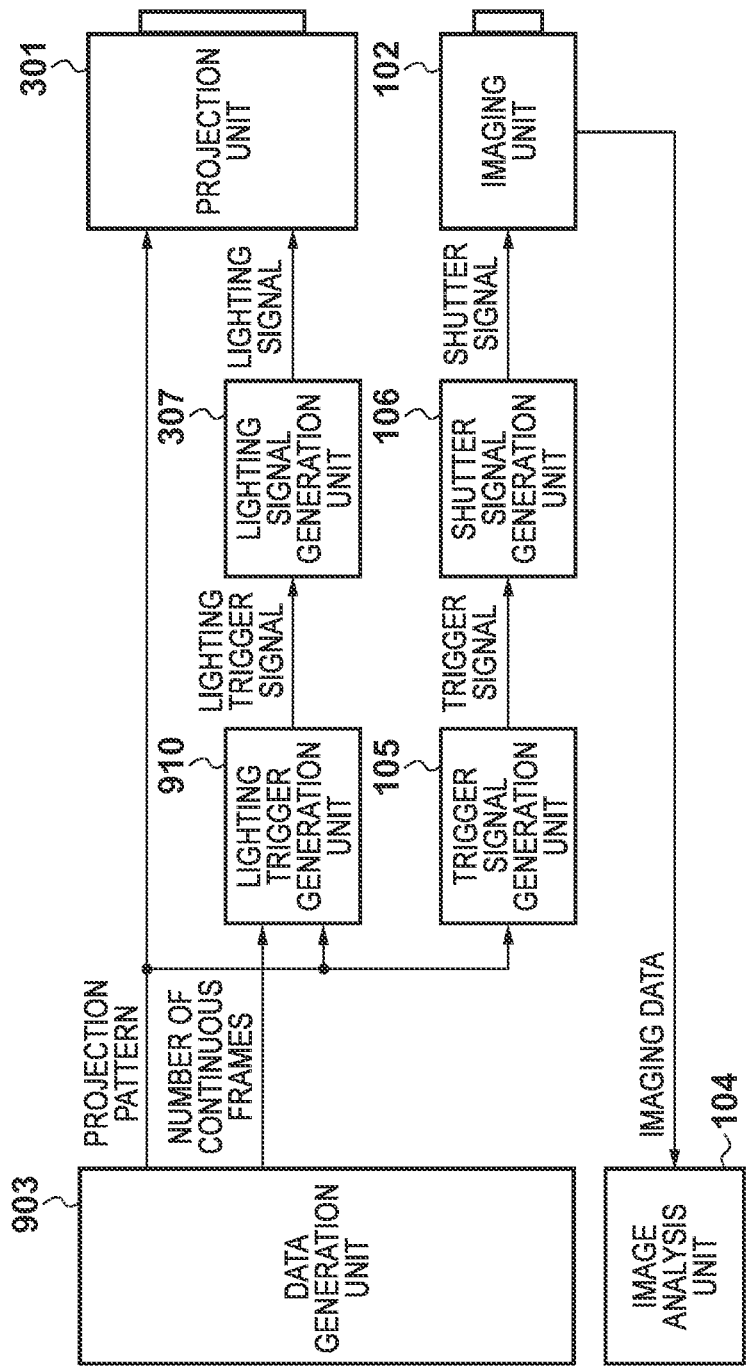

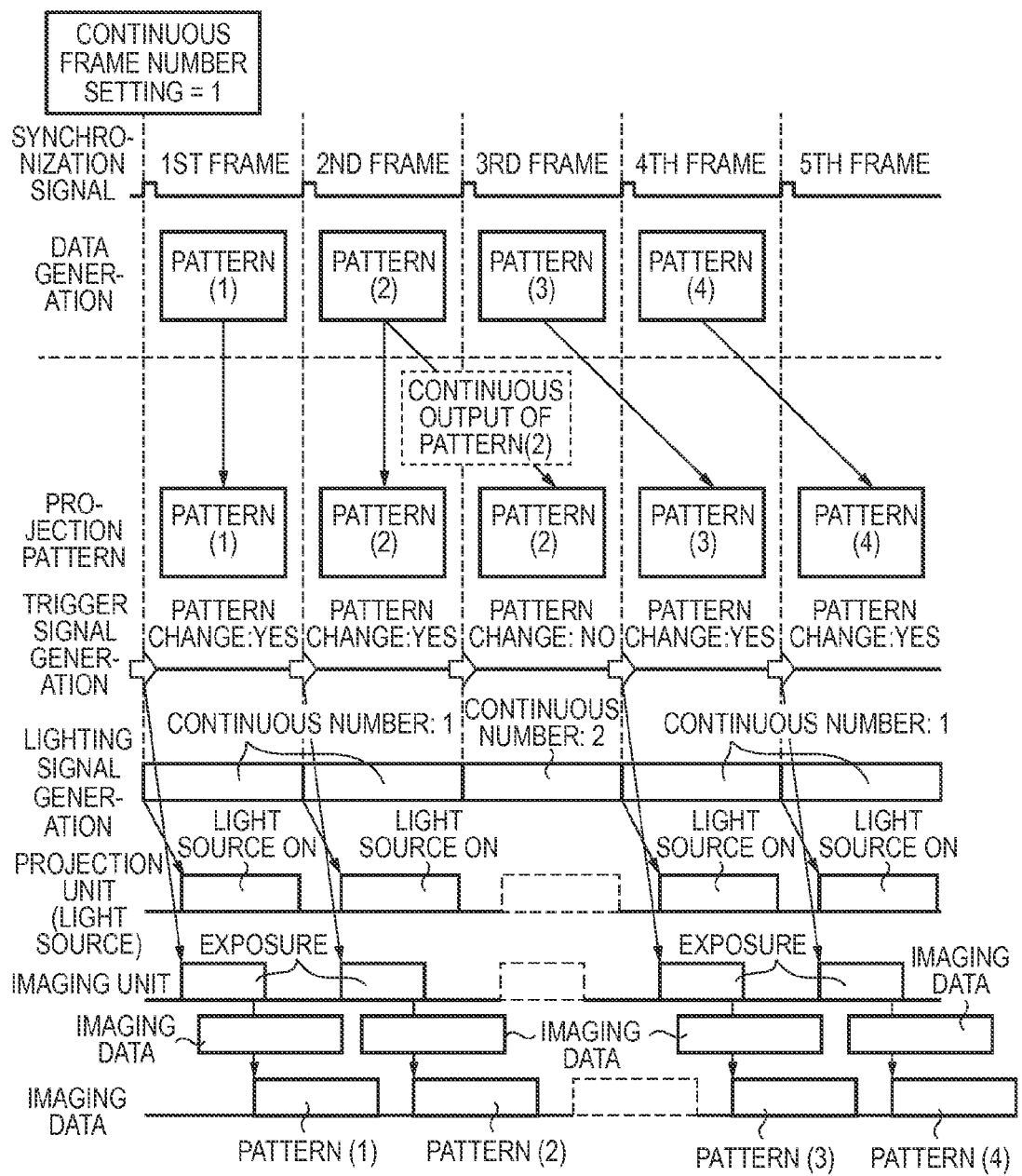

INFORMATION PROCESSING APPARATUS, CONTROL METHOD OF INFORMATION PROCESSING APPARATUS, AND STORAGE MEDIUM FOR DETERMINING WHETHER A PROJECTION PATTERN OF A CURRENT FRAME DIFFERS FROM THAT OF A PREVIOUS FRAME

CLAIM OF PRIORITY

This application claims the benefit of Japanese Patent Application No. 2011-267258, filed on Dec. 6, 2011, which is hereby incorporated by reference herein in its entirety.

BACKGROUND OF THE INVENTION

1. Field of the Invention

The present invention relates to an information processing apparatus, a control method of an information processing apparatus, and a storage medium.

2. Description of the Related Art

Methods of measuring the shape of an object include a pattern projection technique, for example. This method involves projecting a plurality of patterns onto a target object while switching between the patterns, measuring distance information by analyzing images captured of light reflected thereby, and acquiring the shape of the object. In order to perform high-speed imaging for each pattern at this time, the timing at which the projection patterns are switched, and the imaging timing need to be accurately synchronized.

Japanese Patent No. 04391137 discusses a method that involves storing patterns in memory, in advance, in the order in which they will be projected, and projecting the stored patterns onto the target object continuously during measurement.

On the other hand, as for a control apparatus for switching and generating projection patterns, improvement in development efficiency can be anticipated by using a PC loaded with an operating system (OS) such as Windows (registered trademark), which has a substantial application development environment and is easy to install.

However, since an OS, such as Windows, is a non-real time OS, processing for creating and switching projection patterns may not be performed on a timely enough basis, and the same pattern may be output continuously, in which case, imaging data will be duplicated.

This duplication of imaging data will be described, with reference to FIG. 15. In the example in FIG. 15, four types of projection patterns 1 to 4 are generated on the system side, and these patterns are controlled so as to be respectively switched, projected, and imaged, one frame at a time. However, since pattern 3 was not generated within one frame, pattern 2 is in fact projected continuously in two frames, resulting in pattern 2 being redundantly acquired as imaging data. Also, since the frequency, with which duplication occurs and the number of frames in which duplicate patterns are continually projected, are irregular, processing for eliminating duplication by identifying identical patterns within imaging data on the system side is needed, increasing the load during image analysis.

With the method disclosed in Japanese Patent No. 04391137, sufficient memory for storing several projection patterns needs to be installed. Also, the memory needs to be rewritten in order to change the patterns, and hardware needs to be changed in order to add patterns. Also, in Japanese Patent No. 04391137, a method of generating a pattern each time is also disclosed, but imaging data could possibly be duplicated in a case when high-speed processing that requires that patterns be switched in units of one frame is performed.

SUMMARY OF THE INVENTION

The present invention provides technology for preventing duplication of imaging data, even when projection patterns are generated, while being switched at a high frame rate and imaged.

According to one aspect, the present invention provides an information processing apparatus comprising a data generation unit configured to sequentially generate projection patterns, a projection unit configured to project a projection pattern onto a target object every frame, a trigger signal generation unit configured to generate a trigger signal in a case when the projection pattern of the current frame to be projected onto the target object is different from the projection pattern of the previous frame, and an imaging unit configured to image the target object onto which the projection pattern is projected, according to the trigger signal.

According to another aspect, the present invention provides a control method of an information processing apparatus, comprising the steps of sequentially generating projection patterns, projecting a projection pattern onto a target object every frame, generating a trigger signal in a case when the projection pattern of the current frame to be projected onto the target object is different from the projection pattern of the previous frame, and imaging the target object, onto which the projection pattern is projected, according to the trigger signal.

According to yet another aspect, the present invention provides an information processing apparatus comprising a data generation unit configured to sequentially generate projection patterns, a projection unit configured to project a projection pattern onto a target object every frame, a trigger signal generation unit configured to generate a trigger signal in a case when the projection pattern of the current frame to be projected onto the target object is different from the projection pattern of the previous frame, a shutter signal generation unit configured to output a shutter signal to an imaging unit at a preset timing, according to the trigger signal generated by the trigger signal generation unit, the imaging unit configured to image the target object, onto which the projection pattern is projected, according to the shutter signal, and a lighting signal generation unit configured to output a lighting signal to a light source of the projection unit at a preset timing, according to the trigger signal generated by the trigger signal generation unit, wherein the projection unit turns on the light source and projects the projection pattern onto the target object for only a period controlled by the lighting signal.

Further features of the present invention will be apparent from the following description of exemplary embodiments, with reference to the attached drawings.

BRIEF DESCRIPTION OF THE DRAWINGS

FIG. 8 is a timing chart for illustrating operations in the case of control being performed in units of two frames according to a sixth embodiment.

FIG. 9 is a block diagram showing a configuration of a three dimensional shape measurement apparatus according to a seventh embodiment.

FIG. 10 is a timing chart for illustrating operations according to the seventh embodiment.

DESCRIPTION OF THE EMBODIMENTS

Exemplary embodiments of the present invention will now be described in detail with reference to the drawings. It should be noted that the relative arrangement of the components, the numerical expressions and numerical values set forth in these embodiments do not limit the scope of the present invention, unless it is specifically stated otherwise.

First Embodiment

Figure 1:
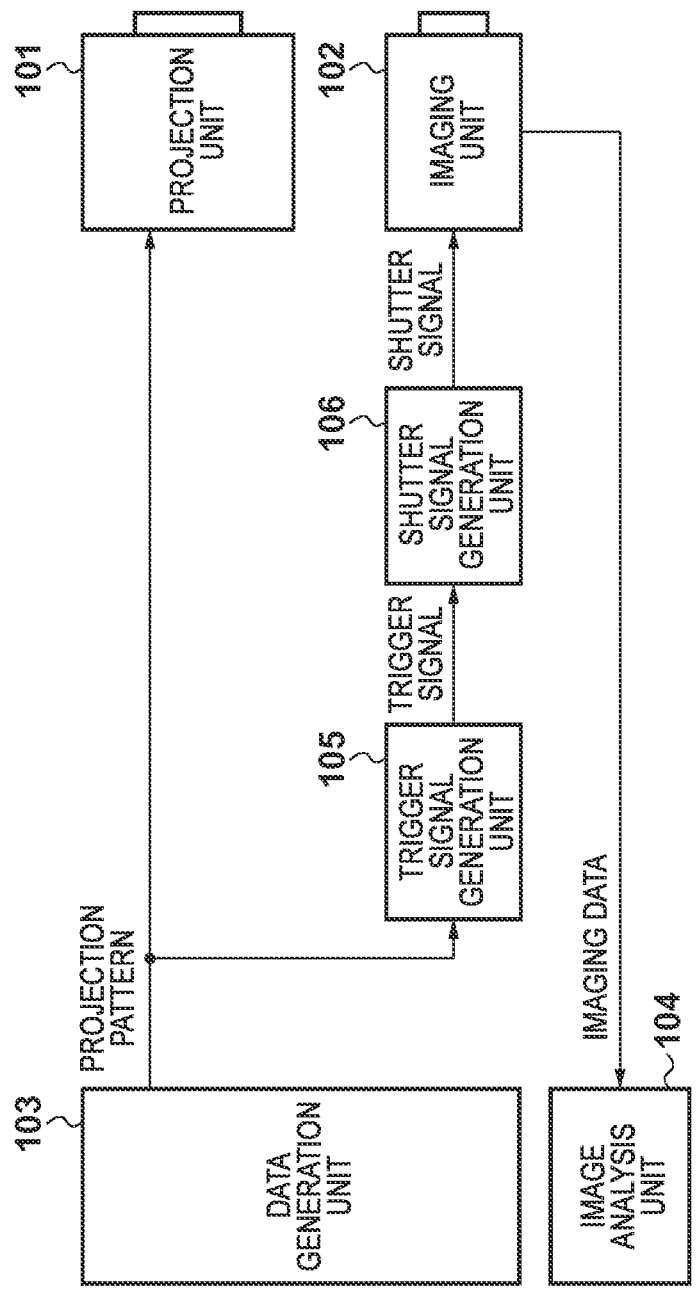
FIG. 1 is a block diagram showing a configuration of a three dimensional shape measurement apparatus according to a first embodiment.

FIG. 1 is a block diagram showing a configuration of a three dimensional shape measurement apparatus (information processing apparatus) according to a first embodiment. In the first embodiment, a change of projection pattern is detected, and output of a shutter signal to be input to an imaging unit is controlled.

The three dimensional shape measurement apparatus in the present embodiment is provided with a projection unit 101, an imaging unit 102, a data generation unit 103, an image analysis unit 104, a trigger signal generation unit 105, and a shutter signal generation unit 106.

The projection unit 101, on receiving input of projection patterns sequentially generated by the data generation unit 103, projects the input projection patterns onto a measurement target object, which is not shown. The imaging unit 102, on receiving input of a shutter signal generated by the shutter signal generation unit 106, performs imaging on the measurement target object, onto which a pattern is projected, for a preset exposure period. The data generation unit 103 sequentially generates projection patterns for projection by the projection unit 101, in accordance with the projection timing, and outputs the generated projection patterns, respectively, to the projection unit 101 and the trigger signal generation unit 105.

The image analysis unit 104 analyzes image data captured by the imaging unit 102, and acquires a three dimensional shape. The trigger signal generation unit 105, on detecting that the projection pattern input from the data generation unit 103 has changed from the previous frame, outputs a trigger signal to the shutter signal generation unit 106. The shutter signal generation unit 106, on receiving input of a trigger signal from the shutter signal generation unit 106, generates a shutter signal having a preset timing and a pulse width, based on the trigger signal, and outputs the generated shutter signal to the imaging unit 102.

Figure 2A:
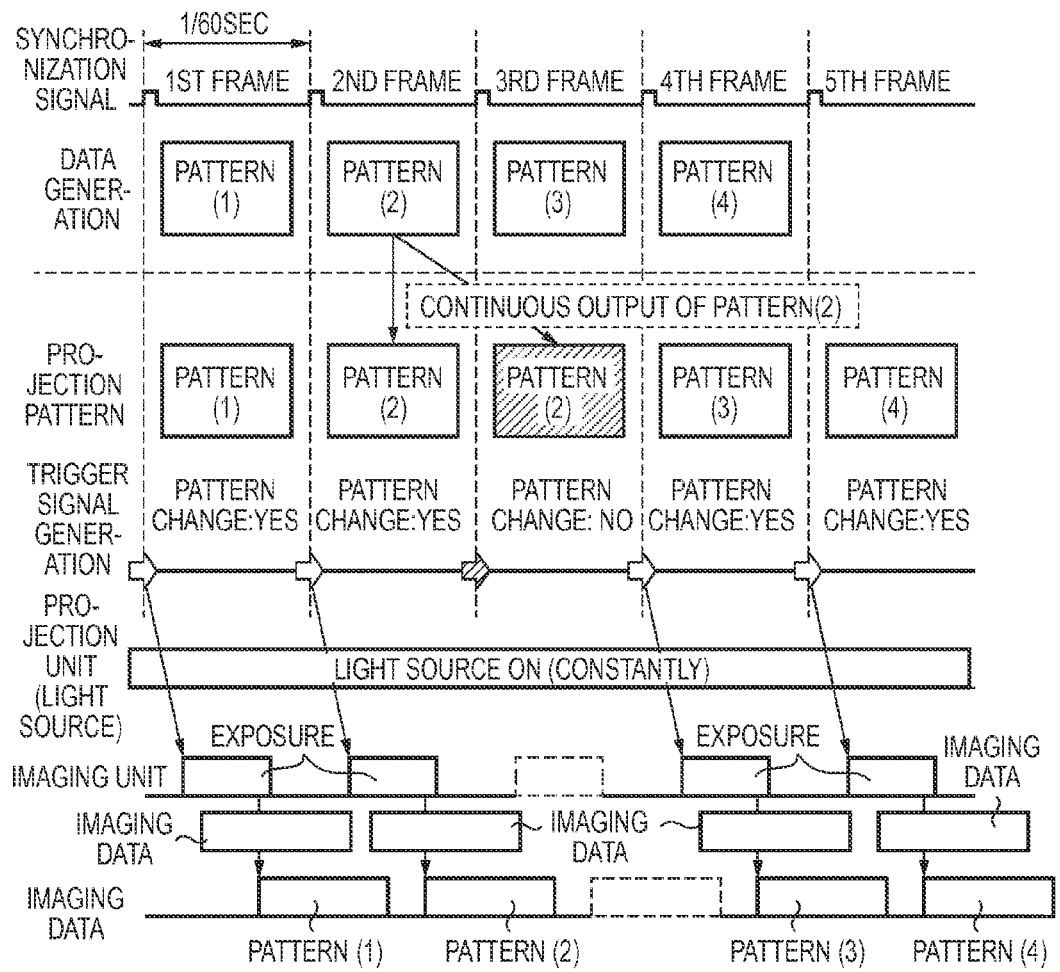
FIGS. 2A and 2B are timing charts for illustrating operations according to the first embodiment.

Next, the overall operations will be described with reference to FIG. 2A, taking a three dimensional shape measurement method using a pattern projection technique as an example. In the case of a pattern projection technique, known as the space coding method, the data generation unit 103, which is constituted in a PC loaded with a Windows OS, for example, sequentially generates projection patterns so as to display both negative and positive gray code patterns (patterns 1 to 4 on the second level of FIG. 2A).

Here, in order to perform three dimensional shape measurement at a high speed, the data generation unit 103 needs to sequentially generate projection patterns continuously in accordance with the frame rate of the projection unit 101, and to output the generated projection patterns to the projection unit 101. For example, in a case when the projection unit 101 is a standard projector constituted by a display element, such as an LCD (Liquid Crystal Display), or a DMD (Digital Mirror Device), and the frame rate is 60 fps, the data generation unit 103 needs to generate projection patterns 1 to 4 continuously for each frame at intervals of 1/60 of a second, and output the generated patterns to the projection unit 101. However, in this example, pattern 3 is not generated in 1/60 of a second, and pattern 2 is, in fact, output redundantly as the projection pattern in two frames (third level of FIG. 2A).

In this case, since the pattern changes from the previous frame in each of the first, second, and fourth frames of projection patterns, the trigger signal generation unit 105 generates a trigger signal. However, since pattern 2 is output again in the following third frame and the pattern does not change, a trigger signal is not generated (fourth level of FIG. 2A). In other words, although the projection unit 101 projects a projection pattern onto the measurement target object, a shutter signal is generated by the shutter signal generation unit 106 according to the trigger signal in the first, second, and fourth frames, but is not generated in the third frame. Accordingly, only the reflected light of the gray code patterns projected in the first, second, and fourth frames is imaged by the imaging unit 102 (sixth level of FIG. 2A). Imaging data is then input to the image analysis unit 104, which is constituted in the PC, in which the data generation unit 103 is installed, or in another PC, or the like, provided for image analysis. The image analysis unit 104 analyzes the imaging data and measures a three dimensional shape using the principle of triangulation from boundary positions of the negative and positive images.

Also, in this example, since the trigger signal is generated in all frames in which the pattern has changed, the pattern that is projected last needs to be fixed in the data generation unit 103 at the end of imaging, and the pattern at the end of imaging the previous time needs to be stored until imaging is next started. The reason for this is that supposing, for example, pattern 5 is to be used when imaging is next performed in the case when imaging ends with use of pattern 4, it will not be possible to determine, with regard to pattern 5, whether the pattern has changed, if information on pattern 4 is not available.

Figure 2B:
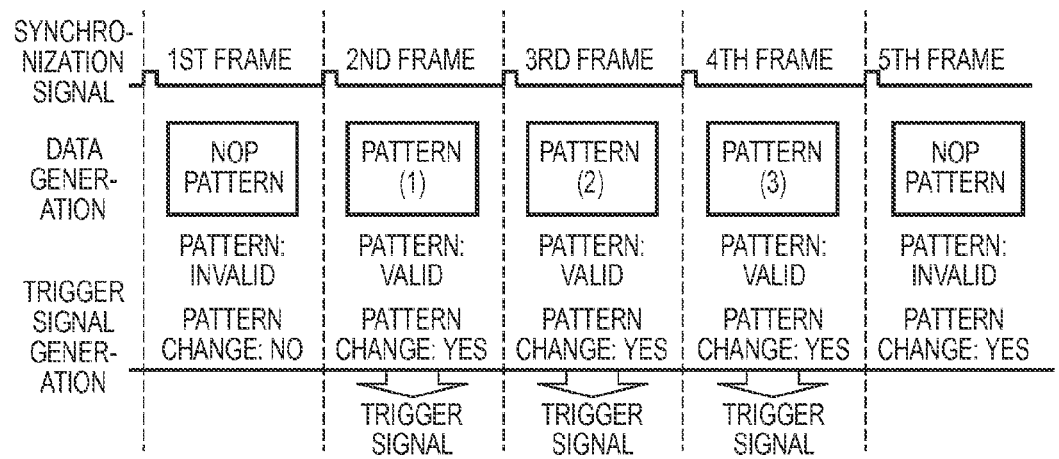

In view of this, as shown in FIG. 2B, a configuration may be adopted, in which a special pattern is allocated to a frame, in which imaging is not performed, with this frame being taken as an NOP (NO Operation) frame, and the trigger signal generation unit 105 identifying an NOP pattern as an invalid pattern. In other words, the trigger signal generation unit 105 need only be provided with a function of generating a trigger signal in the case when an imaging signal is valid, and the projection pattern has changed.

Also, in this example, although the shutter signal generation unit 106 generates a shutter signal whose timing is adjusted based on the trigger signal, a configuration may be adopted, in which the trigger signal is input directly to the imaging unit 102, in the case when the imaging unit 102 has a timing adjustment function. As described above, according to the present embodiment, duplication of imaging data can be prevented, even when projection patterns are sequentially generated, while being switched at a high frame rate and imaged.

Second Embodiment

Figure 3:
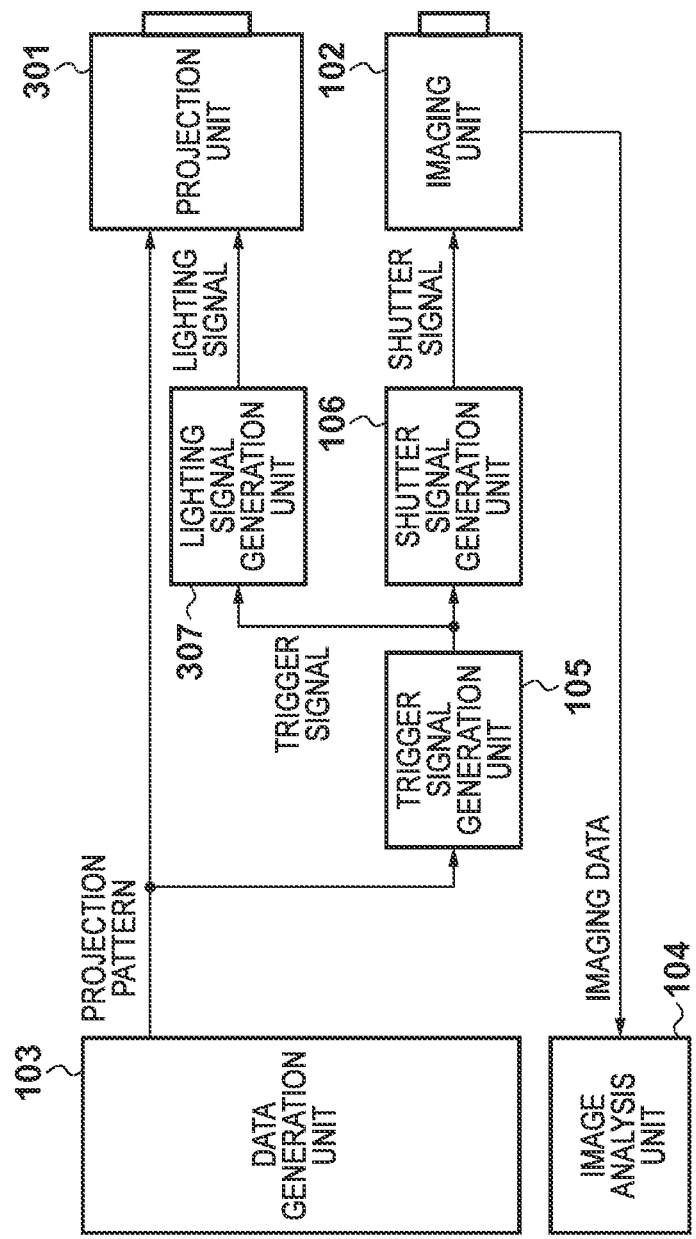
FIG. 3 is a block diagram showing a configuration of a three dimensional shape measurement apparatus according to a second embodiment.

FIG. 3 is a block diagram showing a configuration of a three dimensional shape measurement apparatus according to a second embodiment. In the second embodiment, a change of projection pattern is detected, and output of a lighting signal for controlling lighting of the light source of the projection unit to the projection unit is also controlled, in addition to the shutter signal output to the imaging unit.

Differences from the first embodiment are that the three dimensional shape measurement apparatus is further provided with a lighting signal generation unit 307 that generates a lighting signal for controlling lighting of the light source of a projection unit 301, and that the lighting signal generated by the lighting signal generation unit 307 is output to the projection unit 301. The lighting signal generation unit 307, on receiving input of a trigger signal from the trigger signal generation unit 105, generates a lighting signal at a preset timing based on the trigger signal. The projection unit 301 turns on the light source for only a period controlled by the lighting signal, and projects the projection pattern input from the data generation unit 103 onto the measurement target object, which is not shown. Since the remaining configuration is similar to the first embodiment, a description is omitted.

Figure 4:
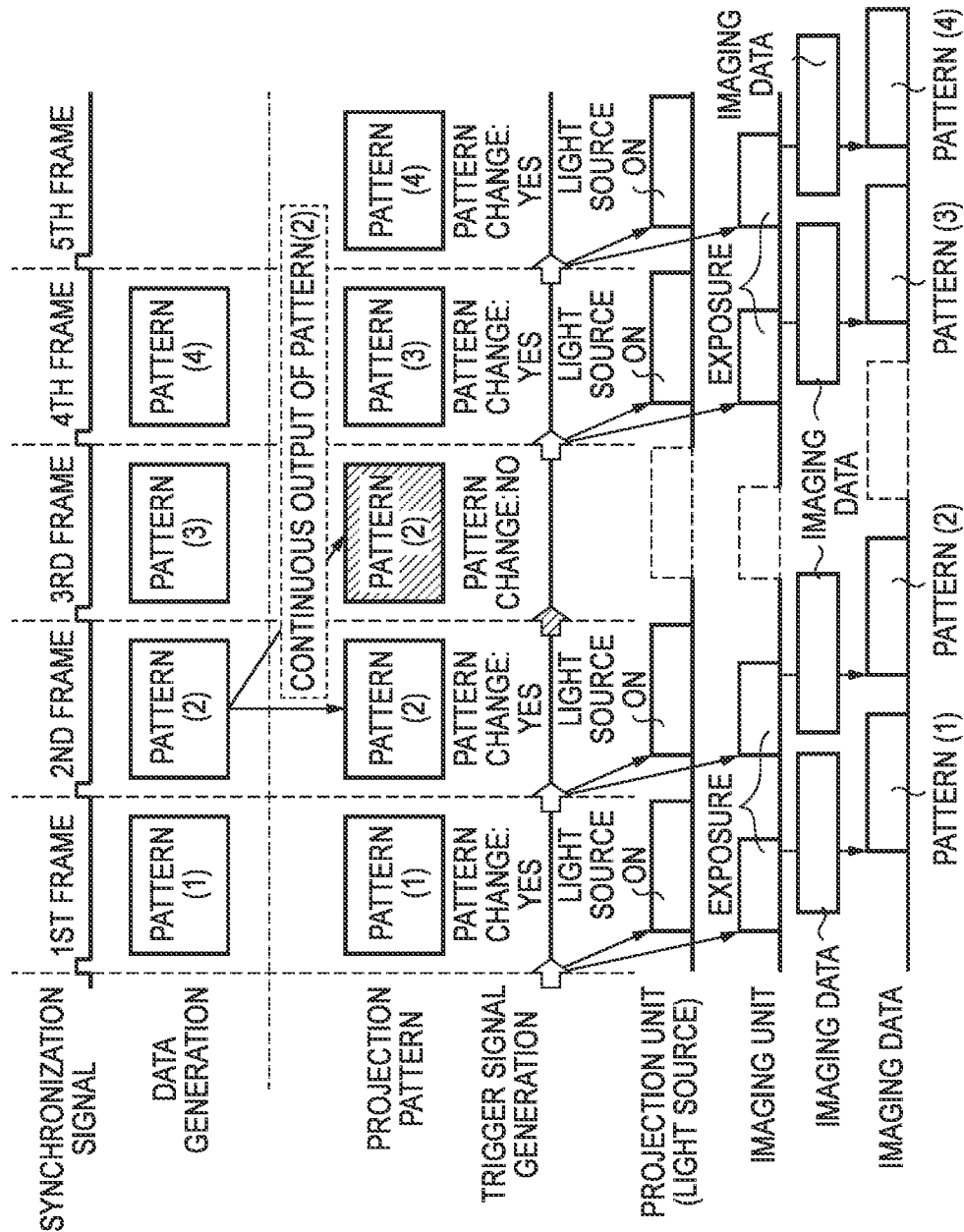
FIG. 4 is a timing chart for illustrating operations according to the second embodiment.

Next, differences in operation from the first embodiment will be described, with reference to FIG. 4. A difference from the first embodiment is that the lighting signal generation unit 307 controls lighting of the light source of the projection unit 301 (fifth level of FIG. 4). In the first embodiment, the light source of the projection unit 301 is constantly turned on, as shown in FIG. 2A, and only the imaging timing is controlled. However, since the projection pattern need only be illuminated while exposure is being performed, the lighting signal generation unit 307 generates the lighting signal, based on the trigger signal, such that the projection light source is turned on in accordance with the exposure period of the imaging unit 102. Such a configuration enables power consumption and heat generation to be suppressed, in the case of a light source capable of high-speed lighting control, such as an LED, for example.

Third Embodiment

Figure 5A:
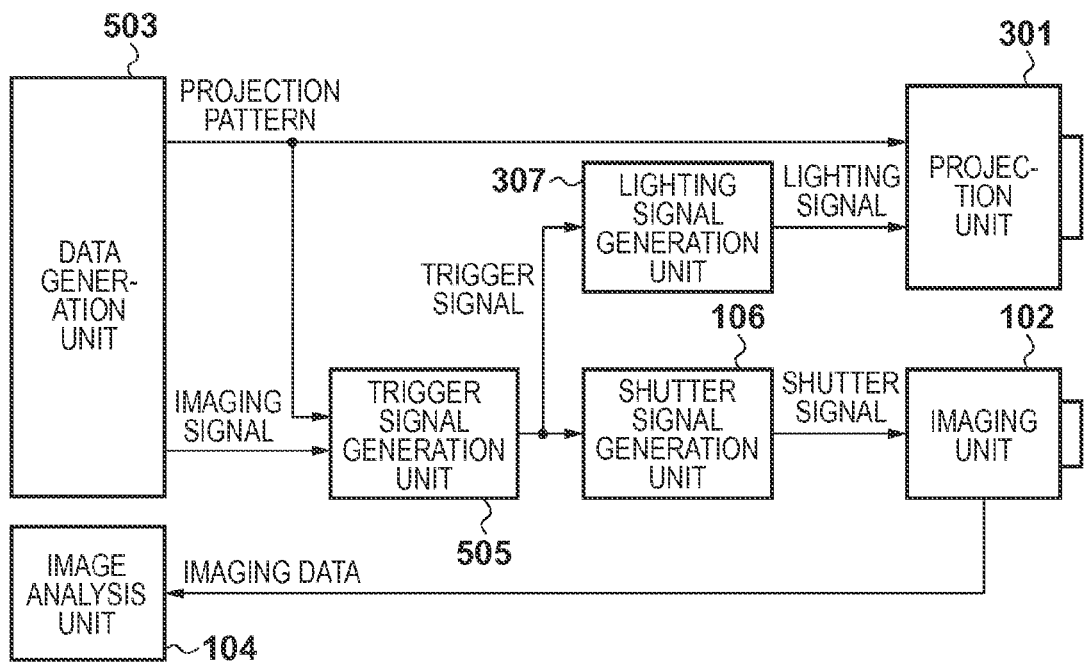
FIGS. 5A and 5B are block diagrams showing a configuration of a three dimensional shape measurement apparatus according to a third embodiment.

FIG. 5A is a block diagram showing a configuration of a three dimensional shape measurement apparatus according to a third embodiment. In the third embodiment, output of the trigger signal is controlled by changing an imaging signal for selecting whether to perform imaging, in accordance with the projection pattern targeted for imaging.

As described in the first embodiment, in the previous examples, since the trigger signal is generated in all frames in which the pattern has changed, the pattern that is projected last needs to be fixed in the data generation unit 103 at the end of imaging, and the pattern at the end of imaging the previous time needs to be stored until imaging is next started. In view of this, in the present embodiment, the imaging signal for selecting whether to perform imaging is generated in accordance with the projection pattern. A difference from the previous examples is that a data generation unit 503 changes the imaging signal in synchronization with the projection pattern to be imaged, and outputs the imaging signal to a trigger signal generation unit 505. The trigger signal generation unit 505 generates a trigger signal in the case when the imaging signal is valid, and the frame is a frame in which the projection pattern has changed.

Exemplary operations showing the relationship between imaging signal and projection pattern will be described, with reference to FIG. 5B. In this example, it is assumed that the pattern that it is desired to image is pattern 2, and pattern 1 is a dummy pattern that is not imaged. Also, it is assumed that imaging is valid when the imaging signal is High, and imaging is invalid when the imaging signal is Low. Here, the imaging signal need only originally have been made valid in the third frame, but the imaging signal is changed with a margin of several frames on either side of the third frame, since the frame in which the imaging signal is changed could possibly shift due to a projection pattern being duplicated.

Figure 5B:
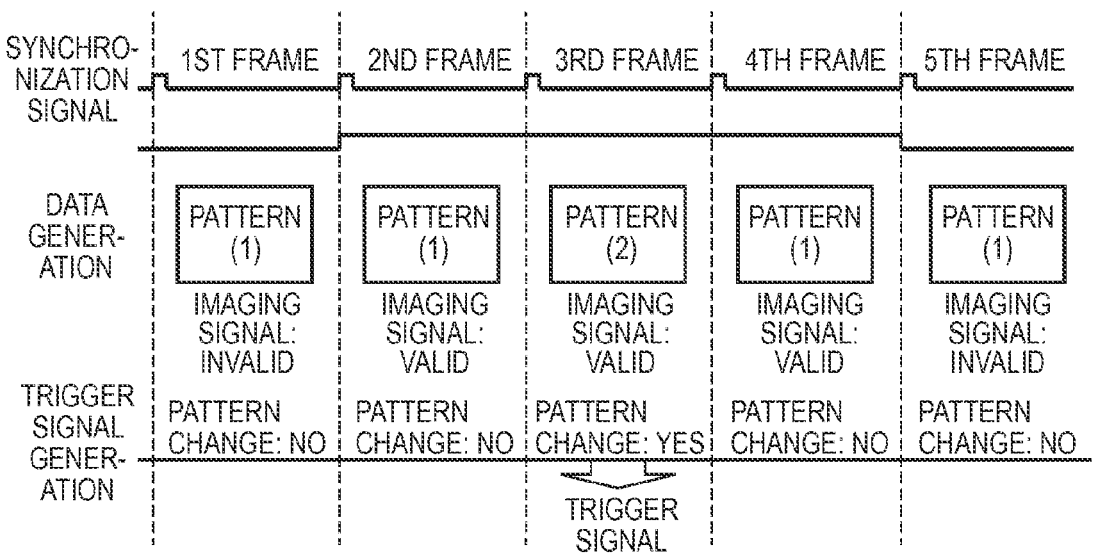

In the example shown in FIG. 5B, the imaging signal is valid in, not only the third frame, but also, the second and fourth frames. That is, the trigger signal generation unit 505 generates a trigger signal in the third frame, which is a frame in which the imaging signal is valid, and the projection pattern has changed. As a result of such a configuration, the previous projection pattern no longer needs to be held until imaging is next started, since the state in the case when imaging is not performed can be arbitrarily fixed, enabling control to be simplified.

Fourth Embodiment

Figure 6:
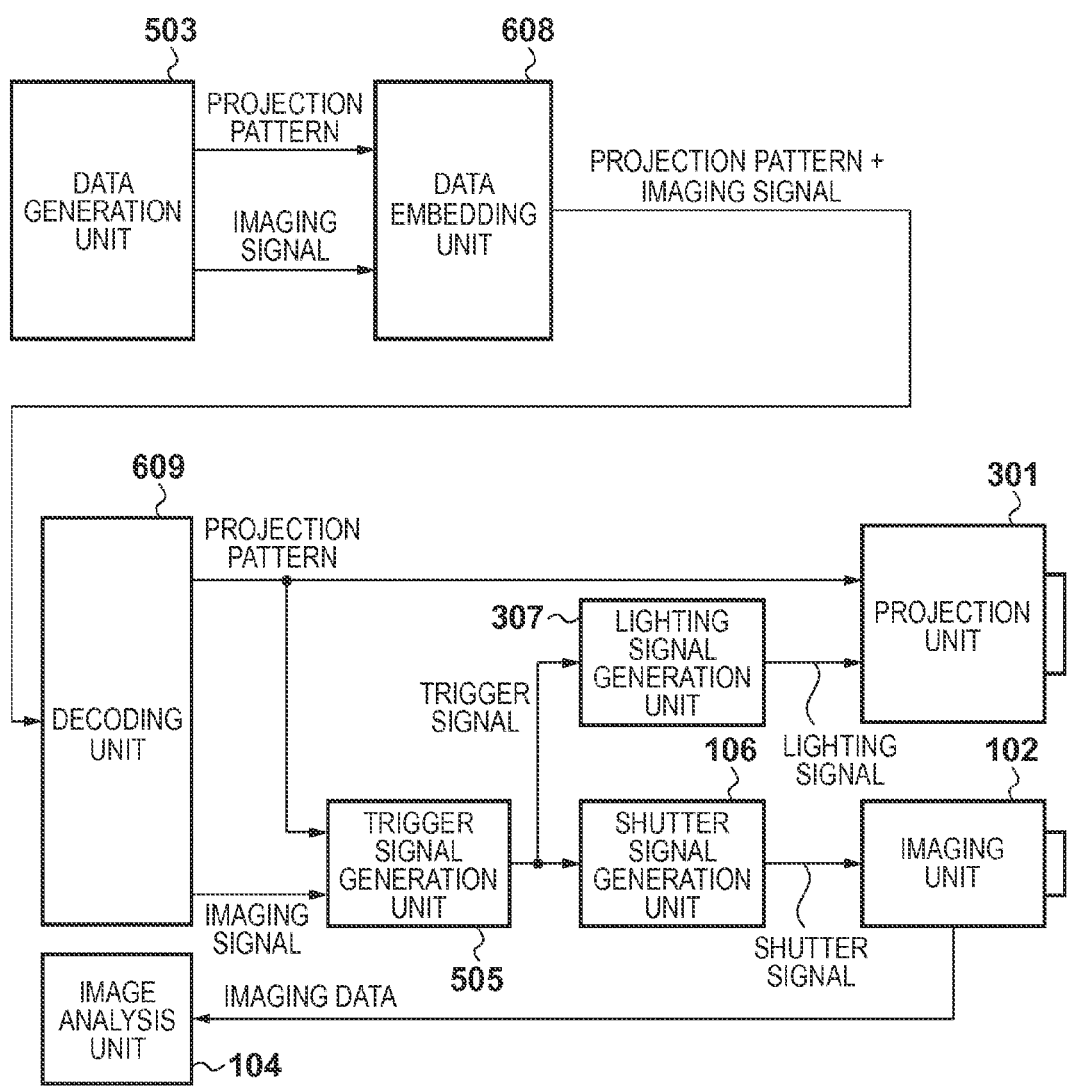
FIG. 6 is a block diagram showing a configuration of a three dimensional shape measurement apparatus according to a fourth embodiment.

FIG. 6 is a block diagram showing a configuration of a three dimensional shape measurement apparatus according to a fourth embodiment. In the fourth embodiment, the imaging signal for selecting whether to perform imaging is embedded in the projection pattern targeted for imaging, and output of the trigger signal is controlled by perfectly synchronizing the projection pattern and the imaging signal.

In the present embodiment, the three dimensional shape measurement apparatus is further provided with a data embedding unit 608 and a decoding unit 609. The case when the data generation unit 503 and the data embedding unit 608 are constituted in a PC loaded with a Windows OS, and the projection pattern, in which the imaging signal is embedded, is output from a graphics board as a digital video signal, such as a DVI signal, for example, is given as a specific example of this configuration. The data generation unit 503 generates an imaging signal that changes in synchronization with the projection pattern targeted for imaging, at the same time as generating the projection pattern. The imaging signal is switched between valid and invalid by, for example, outputting High during the frame period in which the projection pattern is output in the case when imaging is performed, and outputs Low in the case when imaging is not performed.

The data embedding unit 608 embeds an imaging signal in the projection pattern that is to undergo imaging, and transmits the resultant projection pattern to the decoding unit 609 as a video signal. Regarding the method of embedding the imaging signal, a flag signal may be embedded in a specific location of the corresponding projection pattern, or a special pattern may be embedded in an arbitrary location. The decoding unit 609 detects the imaging signal from the video signal received from the data embedding unit 608, and separates the video signal into the projection pattern and the imaging signal. Since the remaining configuration is similar to the third embodiment, a description is omitted.

Also, since the imaging signal is embedded as part of the projection pattern, the imaging signal will also be duplicated at the same time, in the case when the projection pattern is duplicated in two continuous frames. Thus, it is no longer necessary to provide a margin of several frames on either side of the pattern that it is desired to image, such as in the third embodiment, and the start and end of imaging can be controlled more quickly.

Fifth Embodiment

Figure 7A:
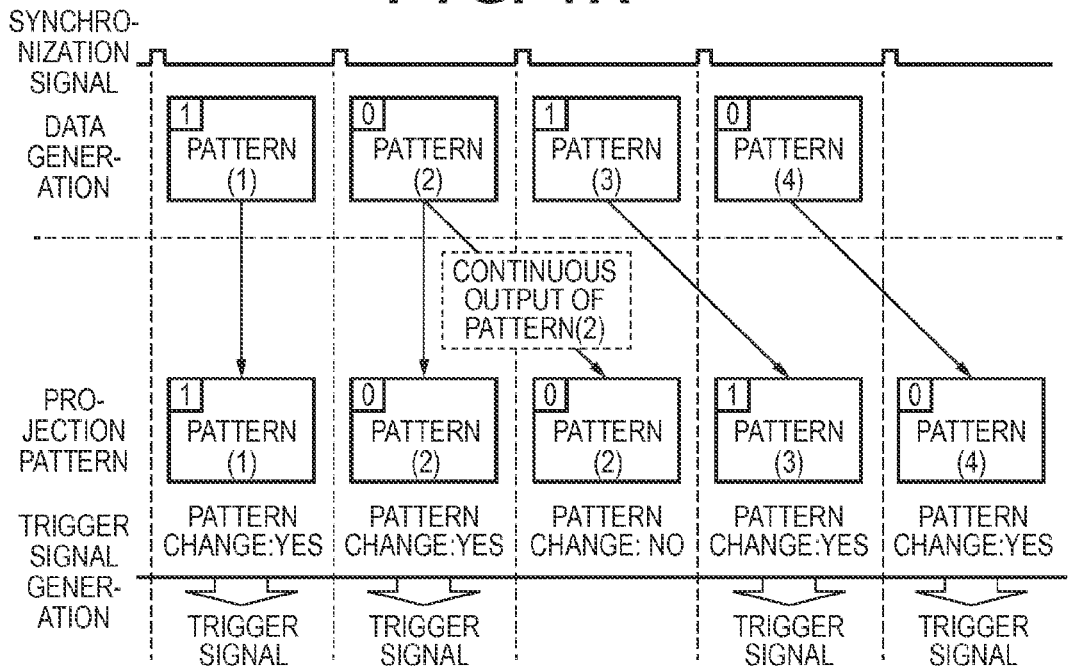
FIGS. 7A and 7B are diagrams illustrating exemplary embedding of a pattern identification signal according to a fifth embodiment.
Figure 7B:
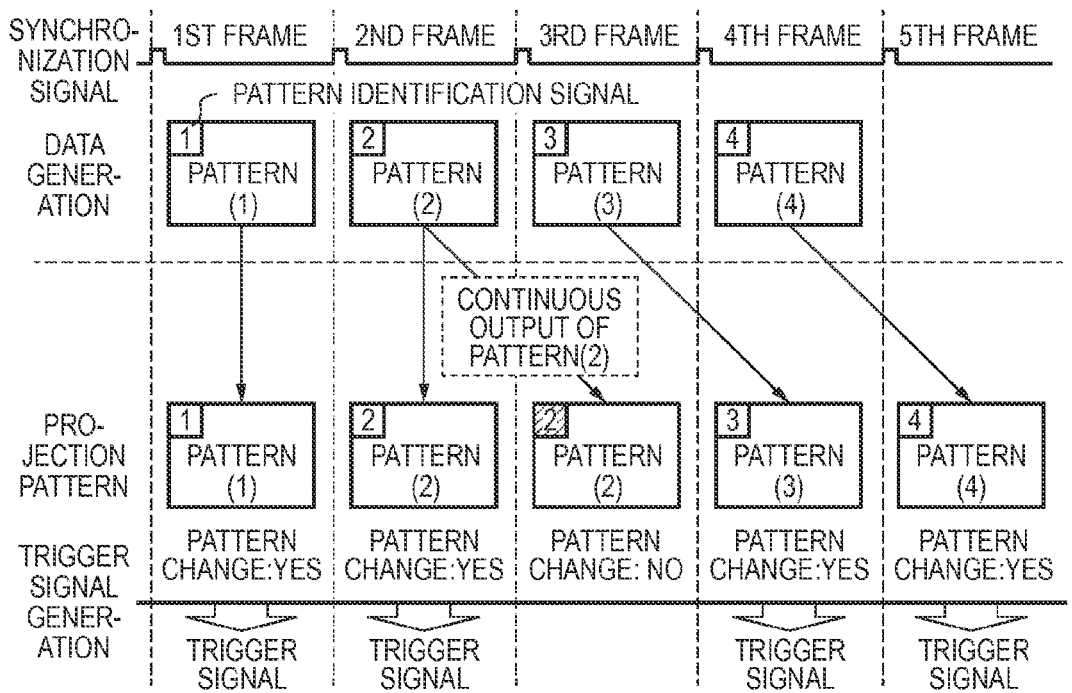

In the previous embodiments, a change of projection pattern is discriminated by comparing whole patterns. In the fifth embodiment, in order to easily detect a change of projection pattern, a pattern identification signal that changes in accordance with a change of projection pattern is embedded in the projection patterns. Exemplary embedding of a pattern identification signal is shown in FIG. 7A and FIG. 7B. FIG. 7A shows an example in which a pattern identification signal that is inverted every frame is embedded, in order to detect only that the projection pattern has changed. In the example shown in FIG. 7A, a pattern identification signal 1 is embedded in pattern 1 and pattern 3, while, on the other hand, a pattern identification signal 0 is embedded in pattern 2 and pattern 4. By detecting a change of projection pattern in this way, a detection of a pattern change is facilitated, enabling the processing load to be reduced. In FIG. 7B, pattern identification signals corresponding to the projection order of projection patterns are embedded, and a trigger signal is not generated when it is discriminated that the same identification signal was output continuously. In the example shown in FIG. 7B, pattern identification signals from 1 to 4 are allocated, and pattern 2 whose pattern identification signal is 2 is duplicated. Thus, a trigger signal is not generated in the third frame.

Sixth Embodiment

FIG. 8 shows exemplary operations in the case when control is performed in units of two frames, in order to secure an exposure period of one or more frames using the projection unit 301 that operates at 60 fps. The operations at this time will be described, taking the configuration of FIG. 3 used in the second embodiment as an example.

Although projection patterns are switched in units of one frame in the previous embodiments, in the present embodiment, the data generation unit 103 generates and switches projection patterns in units of two frames (second level of FIG. 8). That is, pattern 1 is generated in the first frame and the second frame, pattern 2 is generated in the third frame and the fourth frame, and pattern 3 is generated in the fifth frame and the sixth frame, which is not shown. The required exposure time is set in advance in the imaging unit 102, and in the present embodiment can be extended to a maximum length of two frames. Also, the lighting signal generation unit 307 sets the lighting period of the lighting signal in advance, so that the projection unit 301 turns on for only the period corresponding to the exposure time. Also, although the projection pattern is changed at a fixed cycle of two frames, in the present embodiment, the cycle need not be fixed at two frames, and may be an arbitrary fixed cycle of several frames. Such a configuration enables an inexpensive system using a general-purpose projector that performs display at a frame rate of 60 fps or 50 fps to be constituted, since the exposure time can be arbitrarily extended in synchronization with the patterns.

Seventh Embodiment

FIG. 9 is a block diagram showing a configuration of a three dimensional shape measurement apparatus according to a seventh embodiment. In the seventh embodiment, output of the shutter signal to be input to the imaging unit 102 is controlled with only the change of the projection pattern, and output of the lighting signal to be input to the projection unit 301 is controlled, not only by the change of the projection pattern, but also, by further designating the number of frames in which a projection pattern is continuously projected. The three dimensional shape measurement apparatus according to the present embodiment differs in being provided with a lighting trigger generation unit 910. Also, in FIG. 9, the same reference signs are attached to blocks that are the same as portions shown in FIGS. 1 and 3, and a detailed description thereof is omitted.

The data generation unit 903 outputs a projection pattern and a continuous frame number setting signal indicating an allowable number of frames in which a projection pattern can be continuously projected. The lighting trigger generation unit 910 outputs a lighting trigger signal to the lighting signal generation unit 307, in the case when it is detected that the projection pattern has changed from the previous frame, or when the number of frames in which the projection pattern has not changed from the previous frame (number of continuous frames in which the projection pattern of the current frame to be projected onto the target object is the same as the projection pattern of the previous frame) is less than or equal to the allowable number indicated by the continuous frame number setting signal. However, a lighting trigger signal is not output to the lighting signal generation unit 307 in the frame, in which the number of frames in which the projection pattern has not changed from the previous frame, exceeds the allowable number designated by the continuous frame number setting signal.

Exemplary operations in the case when projection and imaging control are performed in units of one frame will be described, with reference to FIG. 10. First, since projection and imaging control are performed in units of one frame, the continuous frame number setting signal is set to "1". Next, the lighting trigger generation unit 910 counts the number of frames in which the projection pattern has not changed, as the continuous number of frames, and compares this number with the value "1" designated by the continuous frame number setting signal. In this example, pattern 3 is not generated in time, and pattern 2 is continuously output in the second frame and the third frame (third level of FIG. 10). Thus, since the continuous number of frames will be "2" in the third frame and exceeds the continuation frame number setting value "1", a lighting trigger signal is not generated (fifth level of FIG. 10). Accordingly, the light source of the projection unit 301 is not turned on in the third frame. Also, since the trigger signal generation unit 105 only generates the trigger signal in frames in which the projection pattern has changed from the previous frame, similarly to the first and second embodiments, a shutter signal for controlling the imaging unit 102 is not generated in the third frame. Accordingly, imaging is not performed in the third frame. According to the present embodiment, duplication of imaging data can be prevented, even when projection patterns are generated, while being switched at a high frame rate and imaged.

Eighth Embodiment

Figure 11:
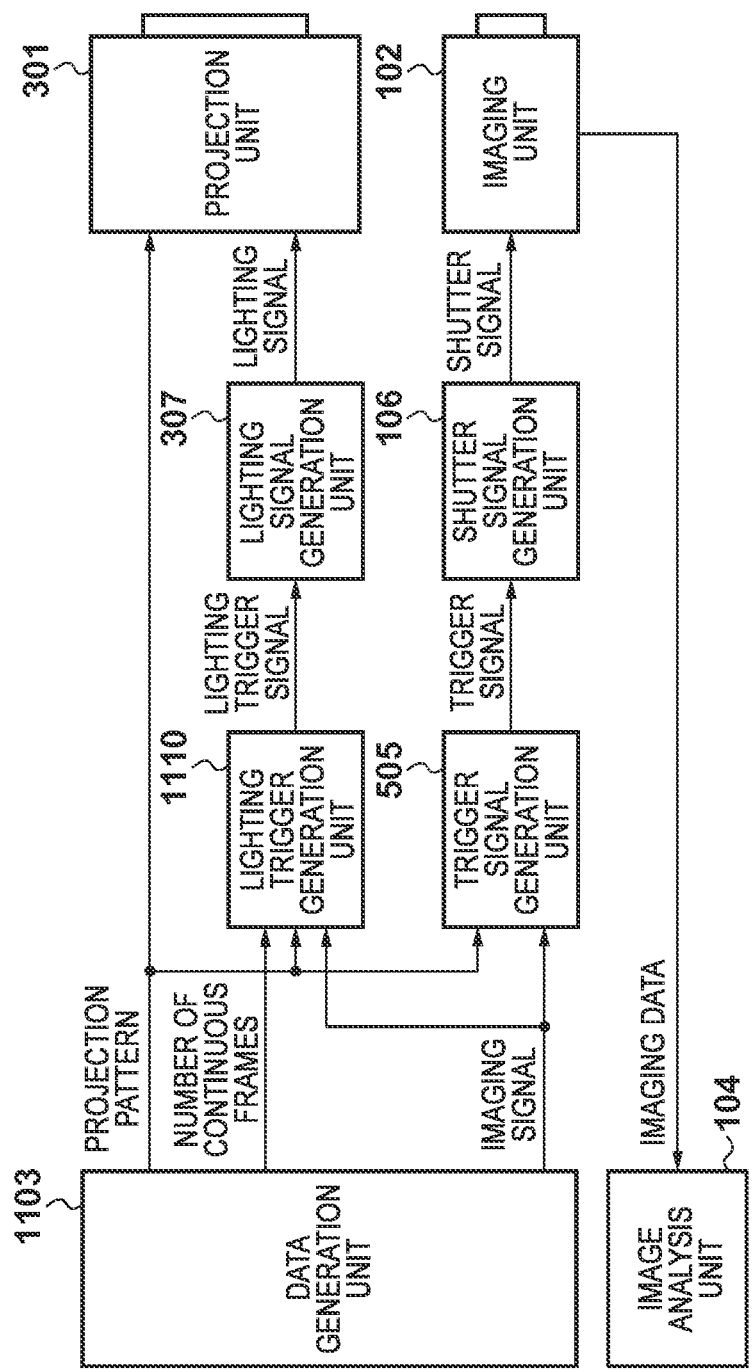
FIG. 11 is a block diagram showing a configuration of a three dimensional shape measurement apparatus according to an eighth embodiment.

FIG. 11 is a block diagram showing a configuration of a three dimensional shape measurement apparatus according to an eighth embodiment. In the eighth embodiment, output of the trigger signal is controlled by changing the imaging signal for selecting whether to perform imaging, in accordance with the pattern targeted for imaging, with the configuration of the seventh embodiment. Also, in FIG. 11, the same reference signs are attached to blocks that are the same as portions shown in FIGS. 5A and 5B, and a detailed description thereof is omitted.

In the seventh embodiment, since the trigger signal is generated in all frames in which the pattern has changed, the pattern that is projected last needs to be fixed in the data generation unit 903 at the end of imaging, and the pattern at the end of the imaging the previous time needs to be stored until imaging is next started. In view of this, in the present embodiment, the data generation unit 903 generates an imaging signal indicating whether imaging is valid or invalid, in accordance with the projection pattern.

A difference from the seventh embodiment is that a data generation unit 1103 outputs an imaging signal that changes in synchronization with the projection pattern to be imaged to the trigger signal generation unit 505 and a lighting trigger generation unit 1110. The trigger signal generation unit 505 generates a trigger signal, in the case when the imaging signal indicates that imaging is valid, and the projection pattern of the current frame to be projected onto the target object is different from the projection pattern of the previous frame. The lighting trigger generation unit 1110 generates a lighting trigger signal, "in the case when the imaging signal is valid, and the frame is a frame in which the projection pattern has changed", or "in the case when the imaging signal indicates that imaging is valid, and the number of frames in which the projection pattern has not changed is less than or equal to the value designated by the continuous frame number setting signal". Also, since the relationship between the imaging signal and the projection pattern is similar to the third embodiment, a description is omitted. According to the present embodiment, duplication of imaging data can be prevented, even when projection patterns are generated while being switched at a high frame rate and imaged.

Ninth Embodiment

Figure 12:
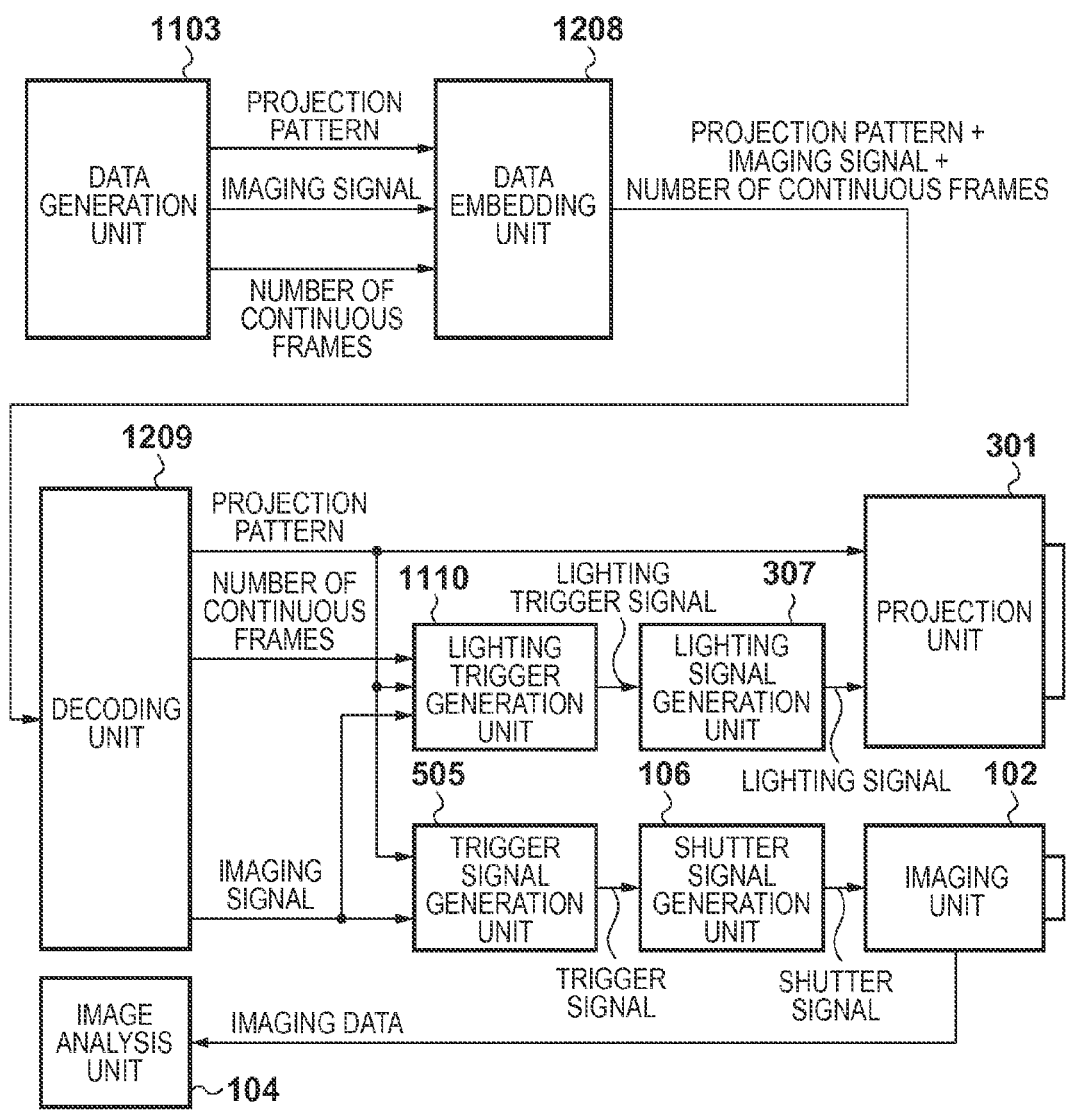
FIG. 12 is a block diagram showing a configuration of a three dimensional shape measurement apparatus according to a ninth embodiment.

FIG. 12 is a block diagram showing a configuration of a three dimensional shape measurement apparatus according to a ninth embodiment. In the ninth embodiment, output of the trigger signal is controlled by embedding the imaging signal for selecting whether to perform imaging in the projection pattern targeted for imaging, and perfectly synchronizing the projection pattern and the imaging signal, with the configuration of the eighth embodiment. In FIG. 12, the same reference signs are attached to blocks that are the same as portions shown in FIG. 11, and a detailed description thereof is omitted.

A difference from the eighth embodiment is that the three dimensional shape measurement apparatus is provided with a data embedding unit 1208 and a decoding unit 1209. The case when the data generation unit 1103 and the data embedding unit 1208 are constituted in a PC loaded with a Windows OS, and the projection pattern, in which the imaging signal is embedded, is output from a graphics board as a digital video signal such as a DVI signal, for example, is given as a specific example of this configuration.

The data embedding unit 1208 embeds an imaging signal and a continuous frame number setting signal in the projection pattern that is to undergo imaging, and transmits the resultant projection pattern as a video signal. Regarding the method of embedding the imaging signal, a flag signal may be embedded in a specific location of the corresponding projection pattern, or a special pattern may be embedded in an arbitrary location. A similar method may be employed for embedding the continuous frame number setting signal, but since the continuous frame number setting signal does not need to be changed in synchronization with the projection pattern, the continuous frame number setting signal may be preset utilizing a period other than the projection pattern period, such as a video blanking period. The decoding unit 1209 detects the imaging signal and the continuous frame number setting signal from the received video signal, and separates the video signal into the projection pattern, the imaging signal, and the continuous frame number setting signal.

The trigger signal generation unit 505 generates a trigger signal, in the case when the imaging signal indicates that imaging is valid, and the projection pattern separated by the decoding unit 1209 differs from the projection pattern of the previous frame. The lighting trigger generation unit 1110 generates a lighting trigger signal, in the case when the imaging signal indicates that imaging is valid, and the continuous number of frames in which the projection pattern separated by the decoding unit 1209 is the same as the projection pattern of the previous frame is less than or equal to the allowable number of frames indicated by the continuous frame number setting signal. The remaining configuration is similar to the eighth embodiment. According to the present embodiment, duplication of imaging data can be prevented, even when projection patterns are generated while being switched at a high frame rate and imaged.

Tenth Embodiment

Figure 13:
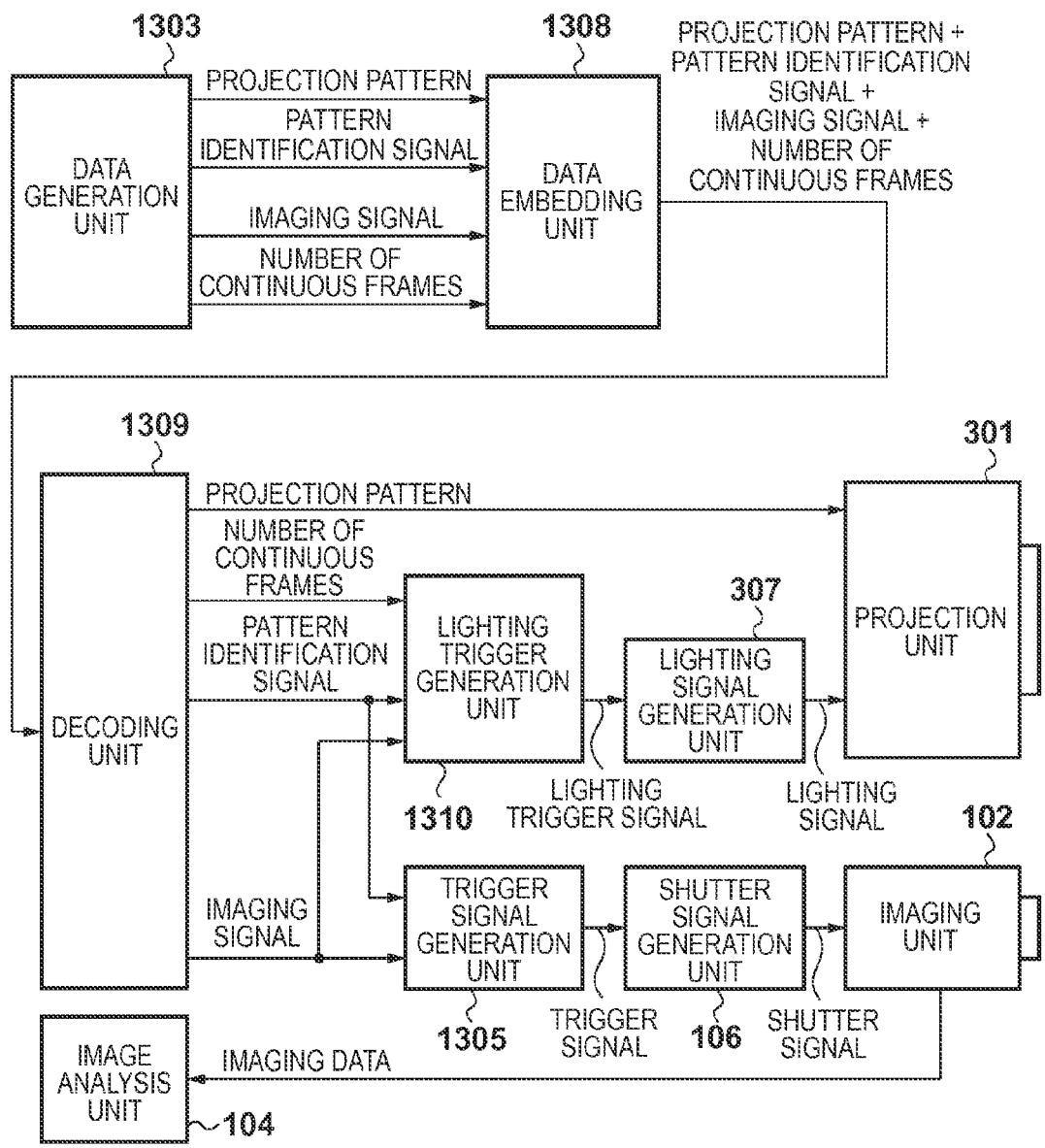
FIG. 13 is a block diagram showing a configuration of a three dimensional shape measurement apparatus according to a tenth embodiment.

FIG. 13 is a block diagram showing a configuration of a three dimensional shape measurement apparatus according to a tenth embodiment. In the tenth embodiment, in order to easily detect a change of projection pattern, a pattern identification signal that changes in accordance with a change of projection pattern is embedded in the projection patterns, with the configuration of the ninth embodiment. In FIG. 13, the same reference signs are attached to blocks that are the same as portions shown in FIG. 12, and a detailed description thereof is omitted.

In the seventh to ninth embodiments, a change of projection pattern is discriminated by comparing whole patterns. In the present embodiment, in order to easily detect a change of projection pattern, a pattern identification signal that changes in accordance with a change of projection pattern is embedded in the projection patterns.

Differences from the ninth embodiment are that a function of generating a pattern identification signal is added, and that the function of detecting a change of projection pattern is changed to a function of detecting a change of the pattern identification signal. Specifically, a data generation unit 1303 further generates a pattern identification signal, in addition to a projection pattern, an imaging signal, and a continuous frame number setting signal.

A data embedding unit 1308 further embeds the pattern identification signal in a projection pattern, in addition to the imaging signal and the continuous frame number setting signal, and transmits the resultant projection pattern as a video signal. A decoding unit 1309 detects the pattern identification signal, the imaging signal, and the continuous frame number setting signal, from the received video signal, and separates the video signal, respectively, into the projection pattern, the pattern identification signal, the imaging signal, and the continuous frame number setting signal. A lighting trigger generation unit 1310 and a trigger signal generation unit 1305 detect whether the projection pattern has changed from the previous frame by a change of pattern identification signal. That is, the trigger signal generation unit 1305 generates a trigger signal, in the case when the imaging signal indicates that imaging is valid, and the pattern identification signal of the projection pattern of the current frame to be projected onto the target object differs from the pattern identification signal of the projection pattern of the previous frame. Also, the lighting trigger generation unit 1310 generates a lighting trigger signal, in the case when the imaging signal indicates that imaging is valid, and the continuous number of frames in which the pattern identification signal of the projection pattern separated by the decoding unit is the same as the pattern identification signal of the projection pattern of the previous frame is less than or equal to the allowable number of frames indicated by the continuous frame number setting signal. According to the present embodiment, duplication of imaging data can be prevented, even when projection patterns are generated, while being switched at a high frame rate and imaged.

Eleventh Embodiment

Figure 14:
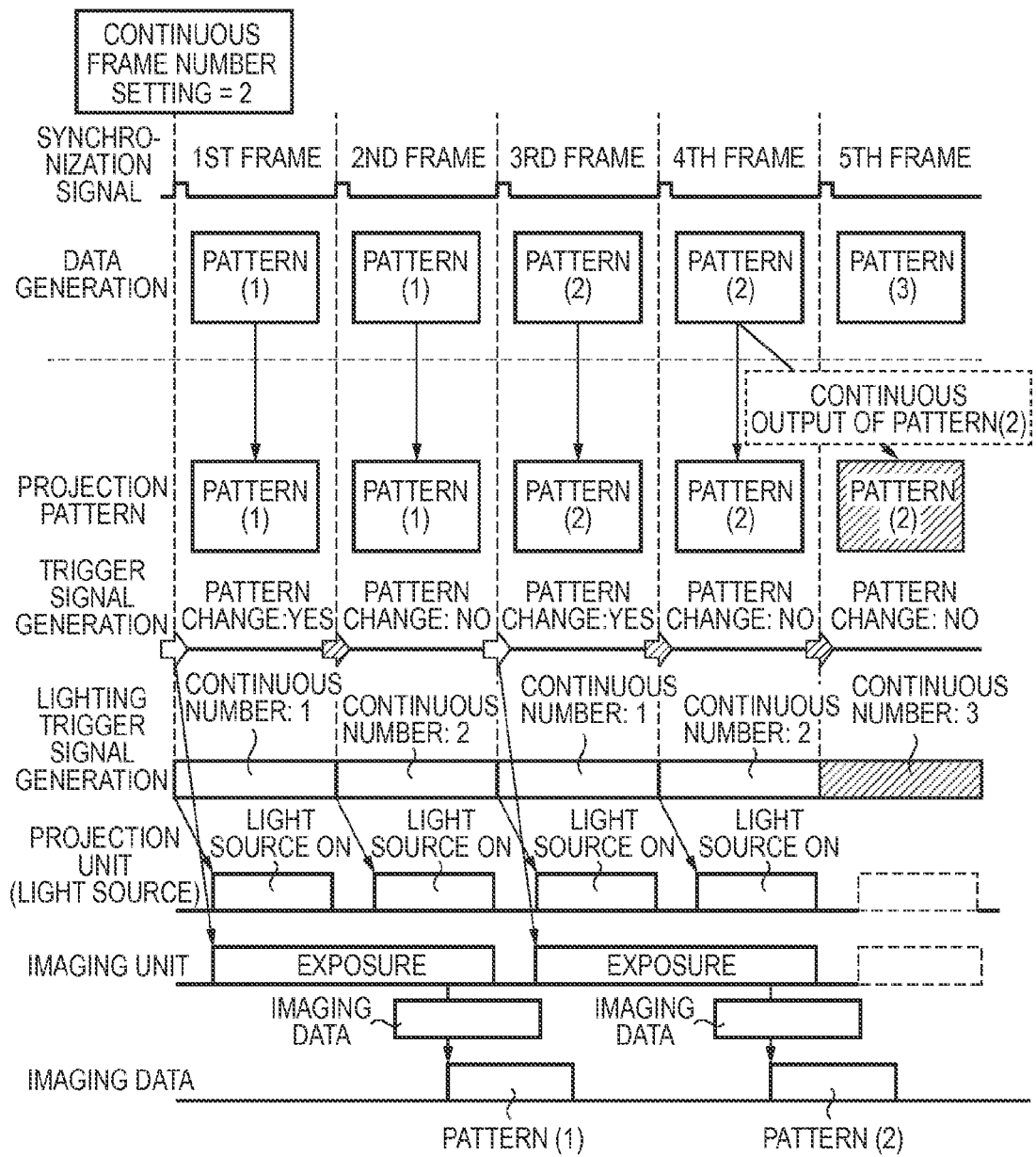
FIG. 14 is a timing chart for illustrating operations in a case when control is performed in units of two frames according to an eleventh embodiment.
Figure 15:
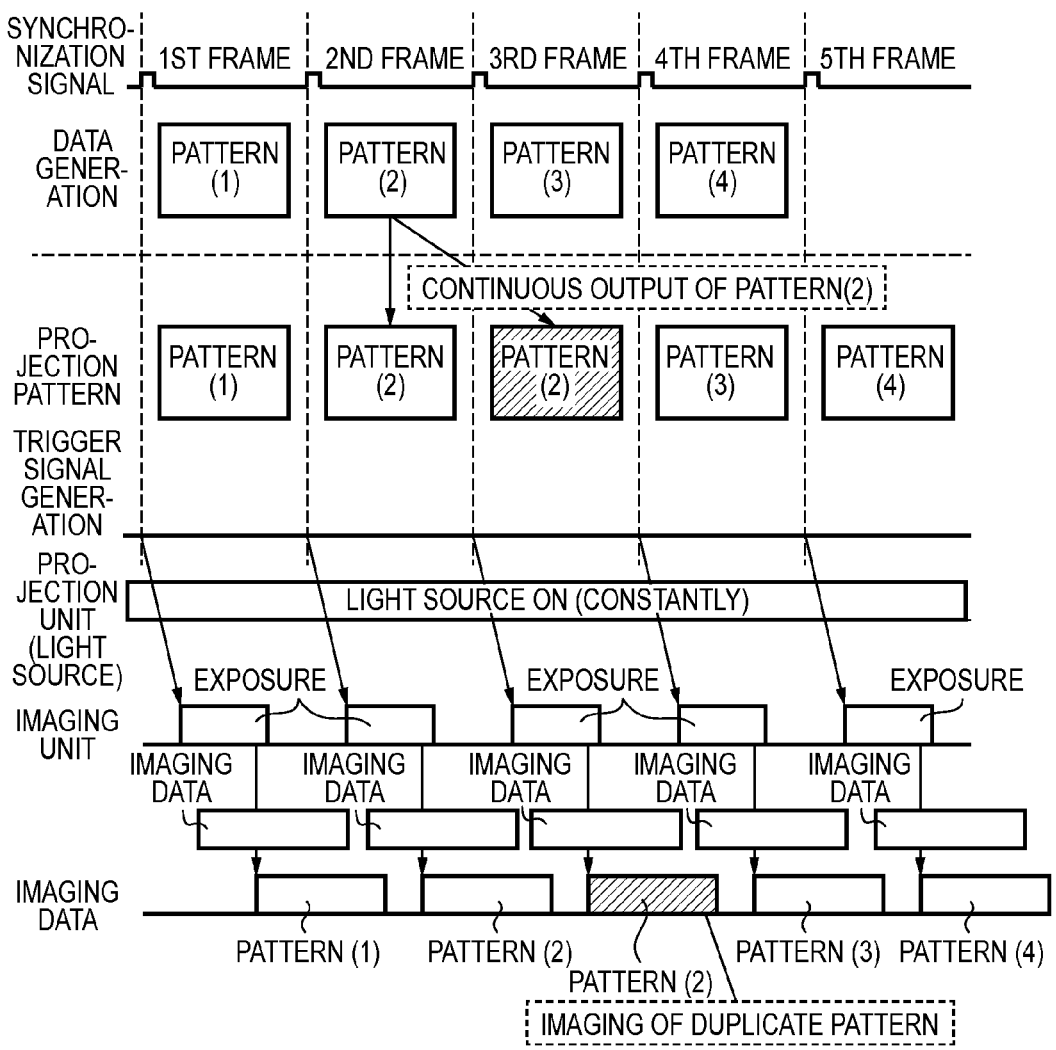
FIG. 15 is a timing chart for illustrating duplication of imaging data.

FIG. 14 shows exemplary operations in the case when control is performed in units of two frames, in order to secure an exposure period of one or more frames using the projection unit 301 that operates at 60 fps. The operations at this time will be described, taking the configuration of FIG. 9 used in the seventh embodiment as an example.

Projection patterns are switched in units of one frame in the seventh embodiment, whereas in the present embodiment, the data generation unit 903 switches and generates projection patterns in units of two frames (second level of FIG. 14). That is, pattern 1 is generated in the first frame and the second frame, pattern 2 is generated in the third frame and the fourth frame, and pattern 3 is generated in the fifth frame and the sixth frame, which is not shown.

The imaging unit 102 sets the required exposure period in advance, and in the present embodiment, the exposure period can be extended to a maximum length of two frames. Also, the lighting signal generation unit 307 sets the lighting period of the lighting signal in advance, so that the projection unit 301 turns on for only a period corresponding to the exposure period.

Since projection and imaging control are performed in units of two frames, the continuous frame number setting signal is set to "2". Next, the lighting trigger generation unit 910 counts the number of frames in which the projection pattern has not changed as the continuous number of frames, and compares the resultant value with the value "2" designated by the continuous frame number setting signal. In this example, pattern 3 of the fifth frame is not generated in time, and pattern 2 is continuously output in the fourth frame and the fifth frame (third level of FIG. 14).

Thus, since the continuous number of frames will be "3" in the fifth frame and exceeds the continuation frame number setting value "2", a lighting trigger signal is not generated (fifth level of FIG. 14). Accordingly, the light source of the projection unit 301 is not turned on in the fifth frame. Also, since a trigger signal is generated only in frames in which the projection pattern has changed from the previous frame, similarly to the first and second embodiment, a shutter signal for controlling the imaging unit 102 is not generated in the fifth frame. Accordingly, imaging is not performed in the fifth frame. Also, although projection patterns are changed at a fixed cycle of two frames in the present embodiment, the cycle need not be fixed.

As a result of such a configuration, light source control of the projection unit and shutter control of the imaging unit can be performed independently, enabling the light source to be turned ON/OFF a plurality of times during one exposure period. Note that, in the example shown in FIG. 14, since the use of a device in which a different pattern from the input pattern is displayed during the blanking period of the projection unit 301 is assumed, the light source is turned OFF during the blanking period, so that unnecessary patterns are not exposed. Therefore, in the case when the same pattern is displayed during the blanking period, the light source can also be continuously turned on by setting the lighting period of the lighting signal to one frame, in advance, in the lighting signal generation unit 307.

According to the present invention, duplication of imaging data can be prevented, even when projection patterns are generated, while being switched at a high frame rate and imaged.

Other Embodiments

Aspects of the present invention can also be realized by a computer of a system or an apparatus (or devices such as a CPU or an MPU) that reads out and executes a program recorded on a memory device to perform the functions of the above-described embodiment(s), and by a method, the steps of which are performed by a computer of a system or an apparatus by, for example, reading out and executing a program recorded on a memory device to perform the functions of the above-described embodiment(s). For this purpose, the program is provided to the computer, for example, via a network or from a recording medium of various types serving as the memory device (for example, a computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing apparatus comprising:
   a data generation unit configured to sequentially generate projection patterns;
   a projection unit configured to project a projection pattern onto a target object every frame;
   a trigger signal generation unit configured to generate a trigger signal when it is detected that the projection pattern of the current frame to be projected onto the target object is different from the projection pattern of a previous frame;
   an imaging unit configured to image the target object, onto which the projection pattern is projected, according to the trigger signal; and a shutter signal generation unit configured to output a shutter signal to the imaging unit at a preset timing, according to the trigger signal generated by the trigger signal generation unit, wherein the imaging unit images the target object, onto which the projection pattern is projected, according to the shutter signal.

2. The information processing apparatus according to claim 1, wherein the data generation unit further generates a continuous frame number setting signal that indicates an allowable number of frames in which a projection pattern can be continuously projected, the information processing apparatus further comprising:

a lighting trigger generation unit configured to generate a lighting trigger signal, in a case when a continuous number of frames, in which the projection pattern of the current frame to be projected onto the target object is the same as the projection pattern of the previous frame, is less than or equal to the allowable number of frames indicated by the continuous frame number setting signal; and a lighting signal generation unit configured to output a lighting signal to a light source of the projection unit at a preset timing, according to the lighting trigger signal generated by the lighting trigger generation unit, wherein the projection unit turns on the light source and projects the projection pattern onto the target object for only a period controlled by the lighting signal.

3. The information processing apparatus according to claim 2, wherein the data generation unit further generates an imaging signal indicating that imaging is valid or invalid, the trigger signal generation unit generates the trigger signal, in a case when the imaging signal indicates that imaging is valid, and the projection pattern of the current frame to be projected onto the target object is different from the projection pattern of the previous frame, and the lighting trigger generation unit generates the lighting trigger signal, in a case when the imaging signal indicates that imaging is valid, and the continuous number of frames, in which the projection pattern of the current frame to be projected onto the target object is the same as the projection pattern of the previous frame, is less than or equal to the allowable number of frames indicated by the continuous frame number setting signal.

4. The information processing apparatus according to claim 2, wherein the data generation unit further generates a pattern identification signal that, for every projection pattern, identifies the projection pattern, and the trigger signal generation unit generates the trigger signal, in a case when the pattern identification signal of the projection pattern of the current frame to be projected onto the target object is different from the pattern identification signal of the projection pattern of the previous frame, and the lighting trigger generation unit generates the lighting trigger signal, in a case when the continuous number of frames, in which the pattern identification signal of the projection pattern of the current frame to be projected onto the target object is the same as the pattern identification signal of the projection pattern of the previous frame, is less than or equal to the allowable number of frames indicated by the continuous frame number setting signal.

5. The information processing apparatus according to claim 3, further comprising:

a data embedding unit configured to embed the imaging signal and the continuous frame number setting signal in the projection pattern, and to transmit the resultant projection pattern as a video signal; and a decoding unit configured to separate the video signal received from the data embedding unit into the projection pattern, the imaging signal, and the continuous frame number setting signal, wherein the trigger signal generation unit generates the trigger signal, in a case when the imaging signal indicates that imaging is valid, and the projection pattern separated by the decoding unit is different from the projection pattern of the previous frame, and the lighting trigger generation unit generates the lighting trigger signal, in a case when the imaging signal indicates that imaging is valid, and the continuous number of frames, in which the projection pattern separated by the decoding unit is the same as the projection pattern of the previous frame, is less than or equal to the allowable number of frames indicated by the continuous frame number setting signal.

6. The information processing apparatus according to claim 5, wherein the data generation unit further generates a pattern identification signal that, for every projection pattern, identifies the projection pattern, the data embedding unit embeds the imaging signal, the continuous frame number setting signal, and the pattern identification signal in the projection pattern, and transmits the resultant projection pattern as a video signal, the decoding unit separates the video signal received from the data embedding unit into the projection pattern, the imaging signal, the continuous frame number setting signal, and the pattern identification signal, the trigger signal generation unit generates the trigger signal, in a case when the imaging signal indicates that imaging is valid, and the pattern identification signal of the projection pattern separated by the decoding unit is different from the pattern identification signal of the projection pattern of the previous frame, and the lighting trigger generation unit generates the lighting trigger signal, in a case when the imaging signal indicates that imaging is valid, and the continuous number of frames, in which the pattern identification signal of the projection pattern separated by the decoding unit is the same as the pattern identification signal of the projection pattern of the previous frame, is less than or equal to the allowable number of frames indicated by the continuous frame number setting signal.

7. The information processing apparatus according to claim 3, wherein the data generation unit further generates a pattern identification signal that, for every projection pattern, identifies the projection pattern, the trigger signal generation unit generates the trigger signal, in a case when the imaging signal indicates that imaging is valid, and the pattern identification signal of the projection pattern of the current frame to be projected onto the target object is different from the pattern identification signal of the projection pattern of the previous frame, and the lighting trigger generation unit generates the lighting trigger signal, in a case when the imaging signal indicates that imaging is valid, and the continuous number of frames, in which the pattern identification signal of the projection pattern of the current frame to be projected onto the target object is the same as the pattern identification signal of the projection pattern of the previous frame, is less than or equal to the allowable number of frames indicated by the continuous frame number setting signal.

8. An information processing apparatus comprising:
a data generation unit configured to sequentially generate projection patterns;
a projection unit configured to project a projection pattern onto a target object every frame;
a trigger signal generation unit configured to generate a trigger signal when it is detected that the projection pattern of the current frame to be projected onto the target object is different from the projection pattern of a previous frame;
an imaging unit configured to image the target object, onto which the projection pattern is projected, according to the trigger signal; and
a lighting signal generation unit configured to output a lighting signal to a light source of the projection unit at a preset timing, according to the trigger signal generated by the trigger signal generation unit,
wherein the projection unit turns on the light source and projects the projection pattern onto the target object for only a period controlled by the lighting signal.

9. An information processing apparatus comprising:
a data generation unit configured to sequentially generate projection patterns;
a projection unit configured to project a projection pattern onto a target object every frame;
a trigger signal generation unit configured to generate a trigger signal when it is detected that the projection pattern of the current frame to be projected onto the target object is different from the projection pattern of a previous frame; and
an imaging unit configured to image the target object, onto which the projection pattern is projected, according to the trigger signal,
wherein the data generation unit further generates an imaging signal indicating that imaging is valid or invalid, and
the trigger signal generation unit generates the trigger signal, in a case when the imaging signal indicates that imaging is valid, and the projection pattern of the current frame to be projected onto the target object is different from the projection pattern of the previous frame.

10. The information processing apparatus according to claim 9, further comprising:
a data embedding unit configured to embed the imaging signal in the projection pattern, and to transmit the resultant projection pattern as a video signal; and
a decoding unit configured to separate the video signal received from the data embedding unit into the projection pattern and the imaging signal,
wherein the trigger signal generation unit generates the trigger signal, in a case when the imaging signal indicates that imaging is valid, and the projection pattern separated by the decoding unit is different from the projection pattern of the previous frame.

11. The information processing apparatus according to claim 9,
wherein the data generation unit further generates a pattern identification signal that, for every projection pattern, identifies the projection pattern, and
the trigger signal generation unit generates the trigger signal, in a case when the imaging signal indicates that imaging is valid, and the pattern identification signal of the projection pattern of the current frame to be projected onto the target object is different from the pattern identification signal of the projection pattern of the previous frame.

12. An information processing apparatus comprising:
a data generation unit configured to sequentially generate projection patterns;
a projection unit configured to project a projection pattern onto a target object every frame;
a trigger signal generation unit configured to generate a trigger signal when it is detected that the projection pattern of the current frame to be projected onto the target object is different from the projection pattern of a previous frame; and
an imaging unit configured to image the target object, onto which the projection pattern is projected, according to the trigger signal,
wherein the data generation unit further generates a pattern identification signal that, for every projection pattern, identifies the projection pattern, and
the trigger signal generation unit generates the trigger signal, in a case when the pattern identification signal of the projection pattern of the current frame to be projected onto the target object is different from the pattern identification signal of the projection pattern of the previous frame.

13. A control method of an information processing apparatus, the method comprising the steps of:
sequentially generating projection patterns;
projecting a projection pattern onto a target object every frame;
generating a trigger signal when it is detected that the projection pattern of the current frame to be projected onto the target object is different from the projection pattern of a previous frame;
imaging the target object, onto which the projection pattern is projected, according to the trigger signal; and
generating a shutter signal used in the imaging at a preset timing, according to the generated trigger signal,
wherein the target object is imaged, onto which the projection pattern is projected, according to the shutter signal.

14. A non-transitory computer-readable storage medium storing a computer program for causing a computer to execute a control method of an information processing apparatus, the method comprising the steps of:
sequentially generating projection patterns;
projecting a pattern onto a target object every frame;
generating a trigger signal when it is detected that the projection pattern of the current frame to be projected onto the target object is different from the projection pattern of a previous frame;
imaging the target object, onto which the projection pattern is projected, according to the trigger signal; and
generating a shutter signal used in the imaging at a preset timing, according to the generated trigger signal,
wherein the target object is imaged, onto which the projection pattern is projected, according to the shutter signal.

15. An information processing apparatus comprising:
a data generation unit configured to sequentially generate projection patterns;
a projection unit configured to project a projection pattern onto a target object every frame;
a trigger signal generation unit configured to generate a trigger signal when it is detected that the projection pattern of the current frame to be projected onto the target object is different from the projection pattern of a previous frame;

a shutter signal generation unit configured to output a shutter signal to an imaging unit at a preset timing, according to the trigger signal generated by the trigger signal generation unit;

an imaging unit configured to image the target object onto which the projection pattern is projected, according to the shutter signal; and a lighting signal generation unit configured to output a lighting signal to a light source of the projection unit at a preset timing, according to the trigger signal generated by the trigger signal generation unit, wherein the projection unit turns on the light source and projects the projection pattern onto the target object for only a period controlled by the lighting signal.

* * * * *